United States Patent [19]

Kaijou

[11] Patent Number: 5,185,037
[45] Date of Patent: Feb. 9, 1993

[54] PROCESS FOR THE PRODUCTION OF ORGANOSILICA SOL AND SURFACE TREATING AGENT CONTAINING SAME

[75] Inventor: Akira Kaijou, Sodegaura, Japan

[73] Assignee: Idemitsu Kosan Company Limited, Tokyo, Japan

[21] Appl. No.: 575,294

[22] Filed: Aug. 30, 1990

[30] Foreign Application Priority Data

Aug. 2, 1990 [JP] Japan ................. 2-205730

[51] Int. Cl.$^5$ ................. C09K 3/00
[52] U.S. Cl. ................. 106/287.12; 106/287.16; 252/313.2; 252/315.6; 501/12; 501/133
[58] Field of Search ........... 106/18.12, 287.12, 287.16; 252/315.6, 309, 313.2; 501/12, 133

[56] References Cited

U.S. PATENT DOCUMENTS

| | | | |
|---|---|---|---|
| 4,054,536 | 10/1977 | Schaefer et al. | 252/313.2 |
| 4,324,712 | 4/1982 | Vaughn, Jr. | 106/287.16 X |
| 4,476,281 | 10/1984 | Vaughn, Jr. | 106/287.16 X |
| 4,605,446 | 8/1986 | Isozaki | 106/287.16 X |
| 4,950,502 | 8/1990 | Saam et al. | 252/313.2 X |

FOREIGN PATENT DOCUMENTS

49-126594 12/1974 Japan.
660593 11/1951 United Kingdom.

OTHER PUBLICATIONS

Chemical Abstracts, vol. 73, No. 18, Nov. 1970, Abstract No. 91836y Otsubo, Yoshio and Al.: "Controlling Viscosity of Organo-Silicasol", p. 283; column R; of JP-B-45 012 487 (Nissan Chemical Industries) Jul. 5, 1970.

Chemical Abstracts, vol. 73, No. 16, Oct. 1970, Abstract No. 81002j Akabayashi, Hiroshi and Al.: "Organosilica Sols, IV. Gelation of Silica Sol-Methanol System" p. 265; column R; of Kogyo Kagaku Zasshi, 1970, 73(5) 856-871.

Chemical Abstracts, vol. 73, No. 16, Oct. 1970, Abstract No. 81003k Akabayashi, Hiroshi and Al.: "Organosilica Sols, V. Viscosity Changes of Silica Sol-Methanol System on Addition of Amines and Ammonia." p. 265; column R; of Kogyo Kagaku Zasshi, 1970, 73(5), 871-874.

World Patents Index Week 7514, Derwent Publications Ltd., London GB; AN 75-23150W of JP-A-49 126 594 (Shokubai Kasei Kogyo Co) Dec. 1974.

*Primary Examiner*—Karl Group
*Attorney, Agent, or Firm*—Frishauf, Holtz, Goodman & Woodward

[57] ABSTRACT

An organosilica sol having an increased pH is obtained by treating an organosilica sol having pH in an acidic region with an alkali. The organosilica sol is useful as a surface treating agent since it has not only penetrativity into members such as concrete, etc., but also waterproofness and water vapor permeability, and since it causes no deterioration on members such as concrete, etc.

9 Claims, 2 Drawing Sheets

PROCESS FOR THE PRODUCTION OF ORGANOSILICA SOL AND SURFACE TREATING AGENT CONTAINING SAME

BACKGROUND OF THE INVENTION

This invention relates to a process for the production of an organosilica sol and a surface treating agent containing it.

In building, civil engineering, fiber manufacturing and steel industries, it is general practice to use a surface treating agent for the purpose of imparting members with waterproofness and of improving weatherability thereof.

In recent years, the building and civil engineering industries in particular have been faced with a social problem, i.e. deterioration of concrete caused by penetration of external water into concrete due to low concrete density.

One reason for the unobtainability of dense concrete is as follows. With the introduction of a building construction method including a pumping method, etc., for construction of recent taller concrete buildings, concrete having a higher water content is used in order to improve fluidity.

In order to obtain dense concrete, therefore, a water reducing agent capable of reducing a water content without impairing fluidity is under development, and a good result has been obtained to some extent.

Separately, however, in order to prevent the penetration of external water which causes various troubles, vigorous attempts are under way to develop a surface treating agent capable of penetrating into concrete and imparting the concrete with waterproofness by only applying it onto a concrete surface.

In general, an acrylic rubber waterproofing agent and an epoxy resin water proofing agent are known as a coat type waterproofing agent which is one type of waterproofing agents conventionally used for waterproofing treatment of a concrete outer wall. However, these agents of a coat type have defects that they are required to be applied in a large amount to form a coat, that they cannot take advantage of a texture of a concrete surface, and that they lack water vapor permeability sufficient to prevent dew condensation.

Further, there is another problem that these agents are susceptible to UV rays due to being a coat, and have poor weatherability.

Therefore, it has been and is energetically attempted to develop a waterproofing agent of a penetration type which is considered to be advantageous to improve weatherability in particular.

And, a variety of waterproofing agents of a penetration type such as acryl emulsion-, silicone- and silane-based agents are now commercially available.

However, these agents have advantages and disadvantages. These agents do not have water vapor permeability sufficient to prevent dew condensation, although they can impart members with waterproofness.

It is therefore desired to develop a surface treating agent which has penetrativity into members such as concrete and, at the same time, also has both waterproofness and water vapor permeability.

On the other hand, JP-A-49-126594 discloses a process for imparting organosilica sol with hydrophobic nature by esterification of a silanol group on a silica surface in silica sol with a higher alcohol. And, it is also described that the process can give a stable organosilica sol having a silica concentration of 10 to 30% and containing little impurities. However, this publication discloses nothing concerning the use of the above silica sol as a surface treating agent for members such as concrete, and the like.

The present inventor has made a study to examine whether the organosilica sol disclosed in the above publication can be used as a surface treating agent for members such as concrete, fibers and timber, and found that it is highly acidic as strong as pH of 3.89, the use of it as a surface treating agent deteriorates concrete, corrodes reinforcing steel within concrete, and deteriorates fibers and timber.

SUMMARY OF THE INVENTION

It is a first object of this invention to provide a process for the production of an organosilica sol which is suitably usable as a surface treating agent without deteriorating concrete, fibers, timber, and the like.

It is a second object of this invention to provide a silica sol-containing surface treating agent which causes no deterioration of concrete, fibers, timber and the like.

In order to achieve the above objects, the present inventor has made a diligent study and arrived at this invention by finding the following: When an organosilica sol whose pH is in an acidic region is treated with an alkali, strong acid-derived characteristic problems inherent to the above organosilica can be overcome without impairing penetration power, waterproofness and water vapor permeability, and therefore, the resultant silica sol can be used as a surface treating agent for members such as concrete, fibers and timber.

That is, this invention is directed to a process for the production of an organosilica sol which comprises treating an organosilica sol having a pH in an acidic region with an alkali to increase the pH of the organosilica sol.

Further, this invention is directed to a surface treating agent containing an organosilica sol whose pH is increased by treating the organosilica sol having pH in an acidic region with an alkali.

DETAILED DESCRIPTION OF THE INVENTION

Figure 1:
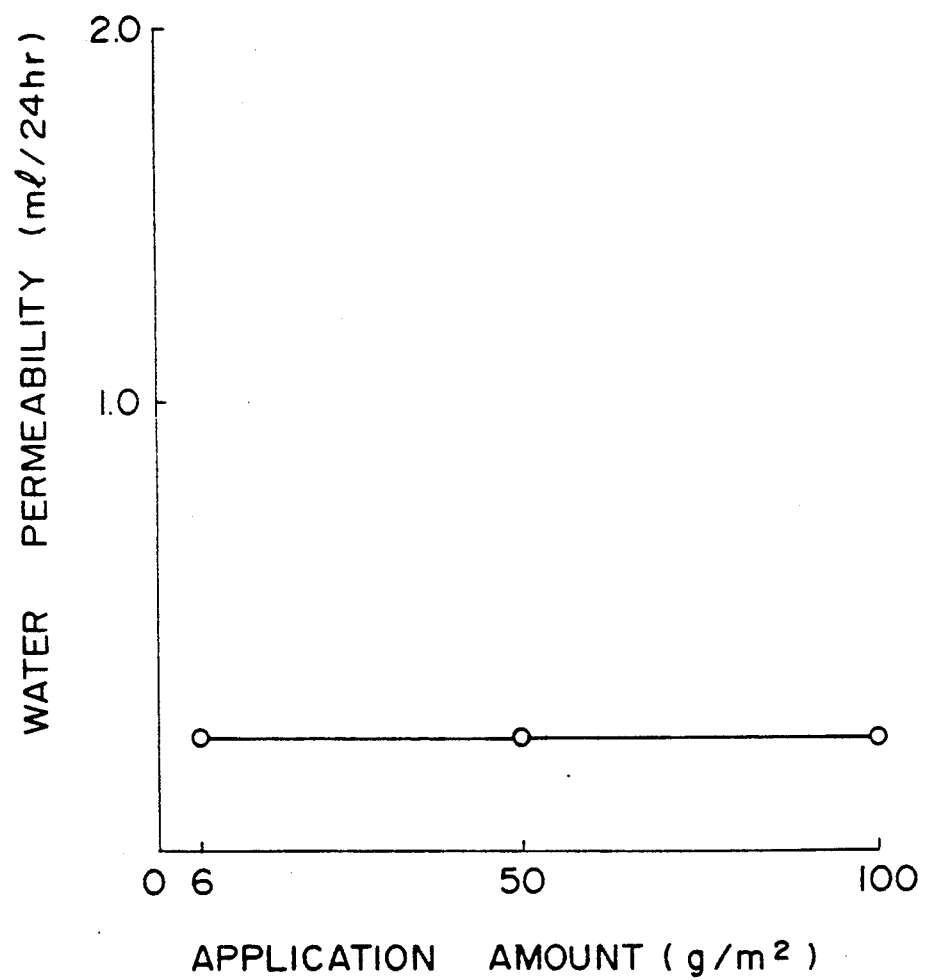
FIG. 1 is a graph for a relationship between an application amount of a surface treating agent of this invention and water permeability.

In the process for the production of the organosilica sol of this invention, particularly preferred as a starting material is an organosilica sol having a pH in an acidic region, whose silica surface is imparted with hydrophobic nature by acidifying a silica sol, adding an organic solvent to the acidified silica sol to subject the resultant mixture to azeotropic dehydration, and adding a higher alcohol to carry out an esterification reaction.

The silica sol used to prepare the above organosilica sol as a starting material is not specially limited, and suitably usable are those which are produced by an acid decomposition electrodialysis method using water glass, a deflocculation method, an ion exchange method, a hydrolysis method using ethyl silicate, and the like. The silica sol is acidified by adding a mineral acid such as sulfuric acid or by ion exchange, and in general, its acidity is adjusted to pH of 3 to 4. Preferred examples of the organic solvent for the azeotropic dehydration are particularly lower alcohols such as methanol, ethanol, n-propanol, isopropanol, n-butanol and amyl alcohol, although the organic solvent shall not be limited to these. The azeotropic dehydration is carried out by a conventional method. Examples of the higher alcohol for the esterification are hexanol, heptanol, octanol, nonanol, capryl alcohol, lauryl alcohol, myristyl alcohol, cetyl alcohol and stearyl alcohol, although the higher alcohol shall not be limited to these.

The esterification reaction using a higher alcohol is carried out preferably at reflux under heat. In this esterification reaction, a silanol group (Si—OH) on the silica surface of a silica sol reacts with a higher alcohol (R—OH) to form an ester group (Si—OR), whereby an organosilica sol is obtained. The silica concentration in this organosilica sol is usually not less than 0.01% by weight, preferably not less than 0.1% by weight. And, the organosilica sol usually has a hydrophobic nature-imparting ratio ("hydrophobic ratio" hereinafter) [a proportion (%) of organic hydrophobic groups (OR groups) to total OH groups on the silica surface] of not less than 1%. That is because sufficient waterproofness cannot always be obtained when the hydrophobic ratio is less than 1%. The hydrophobic ratio is preferably not less than 3%, more preferably not less than 8%.

The organosilica sol is prepared in an acidic region and consequently has pH of as low as 3.89 or less. Therefore, the use thereof as a surface treating agent, e.g. for members such as concrete, fibers and timber deteriorates the concrete, corrodes reinforcing steel within the concrete, and deteriorates the fibers and timber.

Therefore, this invention is directed to an organosilica sol having increased pH, obtained by treating the above organosilica sol having pH in an acidic region with an alkali.

Useful as the above alkali are organic or inorganic basic compounds. Examples of the organic basic compounds are (1) ethanolamines such as N,N-dimethylethanolamine, methyldiethanolamine, triethanolamine, N,N-diethylethanolamine and N,N-dipropylethanolamine; (2) alkylamines such as triethylamine, t-butylamine, 2-ethylhexylamine and triamylamine; and (3) aromatic or cyclic amines such as pyridine, aniline, pyrrole and cyclohexylamine, although the organic basic compounds shall not be limited to these.

Examples of the inorganic basic compounds are sodium hydroxide and potassium hydroxide, although they shall not be limited thereto. These inorganic alkalis are usually used as a 0.01 to 10N aqueous solution, preferably as an about 0.1N aqueous solution.

When an alkali is added to an organosilica sol whose pH is in an acidic region, gelation of the organosilica sol might take place. Further, the ester group (Si—OR) might be hydrolyzed with the alkali to re-form a hydrophilic OH group. In order to increase the pH of the organosilica sol while such gelation and hydrolysis are prevented, the alkali treatment is carried out preferably according to any of the following methods (i), (ii) and (iii).

Method (i): An organosilica sol having pH in an acidic region and a lower alcohol content of not less than 10% by weight is treated with an alkali directly or after it is diluted with a diluent, thereby to increase the pH to not less than 5.0 (preferably not less than 7.0, particularly preferably not less than 9.0), and the organosilica sol is further diluted with a diluent as required.

In the above method (i), the foregoing inorganic or organic base compounds are used as an alkali. And, examples of the diluent are water; alcohols such as methanol, ethanol, propanol, isopropanol, butanol, pentanol, heptanol and octanol; hydrocarbons such as benzene, toluene, xylene, ethylbenzene, cumene, cyclohexane, ethylcyclohexane and decalin; ethers such as diethyl ether, ethyl vinyl ether, butyl vinyl ether, anisole, dioxane, glycol methyl ether, glycol ethyl ether and glycol butyl ether; ketones such as acetone, methyl ethyl ketone, 2-pentanone, 3-pentanone, methyl isobutyl ketone, 2-heptanone, 4-heptanone, diisobutyl ketone, acetonyl acetone and mesithyl oxide; industrial gasoline such as mineral spirit; and petrochemical solvents such as kerosene.

Method (ii): An organosilica sol having pH in an acidic region and a lower alcohol content of not more than 10% by weight is treated with an organic basic compound thereby to increase the pH to not less than 5.0 (preferably not less than 7.0, particularly preferably not less than 9.0), and the organosilica sol is further diluted with a diluent as required.

In this method (ii), the organosilica sol has an alcohol content of not more than 10% by weight, and hence, addition of the above-described inorganic base compound causes geleation. Therefore, the foregoing organic base compounds are used as an alkali. And, examples of the diluents used as required are those which are described in the method (i) are used.

Method (iii): A solvent containing a lower alcohol is added to an organosilica sol having pH in an acidic region and a lower alcohol content of not more than 10% by weight, thereby to increase the lower alcohol content to 10% by weight or more. Then, the organosilica sol is treated with an alkali to increase the pH thereof to not less than 5.0 (preferably not less than 7.0, particularly preferably not less than 9.0), and it is diluted with a diluent as required.

In the method (iii), the foregoing inorganic or organic base compounds are used as an alkali. Examples of the solvent containing a lower alcohol used to increase the lower alcohol content are mixtures of the lower alcohols described in the above method (i) such as ethanol, propanol and isopropanol, etc., with the hydrocarbons, ethers, ketones and petrochemical solvents described in the above method (i). Further, examples of the diluent used as required are also those described in the above method (i).

An organosilica sol whose pH is increased by the above alkali treatment differs from a conventional organosilica sol having pH of as low as not more than 3.89, and it neither deteriorates concrete nor corrodes reinforcing steel within concrete, e.g. when applied to the surface of the concrete. Therefore, it can be suitably used as a surface treating agent for concrete. Further, since the above organosilica sol neither corrodes metals nor deteriorates fibers and timber, it can be suitably used as a surface treating agent for metals, fibers and timber. This organosilica sol does not undergo gelation, nor does it precipitate even when stored for a long period of time. Thus, it has excellent stability.

The surface treating agent of this invention will be explained hereinafter.

The surface treating agent of this invention contains an organosilica sol whose pH is increased. The organosilica sol as an essential component of the surface treating agent of this invention preferably contains an organosilica sol obtained by treating an acidic organosilica sol with an alkali according to the above methods. This organosilica sol has pH of not less than 5.0, preferably not less than 7.0, more preferably not less than 9.0. When the organosilica sol is that which is obtained by imparting a silica surface with hydrophobic nature by using a higher alcohol, the resultant organosilica sol usually has a hydrophobic ratio [a proportion (%) of organic hydrophobic groups (OR groups) to the total OH groups on the silica surface] of not less than 1% as described above. That is because sufficient waterproofness cannot always be obtained when the hydrophobic ratio is less than 1%. The hydrophobic ratio is preferably not less than 3%, more preferably not less than 8%. This organosilica sol usually has a silica concentration of not less than 0.01% by weight, preferably not less than 0.1% by weight. The remaining portions in the organosilica sol are composed of a diluent, an alkali used to increase the pH and other optional components such as a higher alcohol, an emulsifier, a resin mixture, etc. These diluent and alkali are as explained above.

The above higher alcohol may be that which is used for imparting the above silica sol with hydrophobic nature, or may be different therefrom. When the above higher alcohol may be that which is used for imparting the above silica sol with hydrophobic nature, the process for the production of the organosilica sol can be simplified.

Examples of the emulsifier are anionic surfactants such as fatty acid soap, an ether carboxylic acid and salt thereof, a condensate of a higher fatty acid with an amino acid (N-acyl sarcosine acid salt, N-acyl glutamate, etc.), a higher alkylsulfonate, an α-olefin sulfonate, a sulfonate of a higher fatty acid ester, a dialkylsulfosuccinate, a sulfonate of a higher fatty acid amide, an alkylallyl sulfonate, an alkylbenzene sulfonate, an alkylnaphthalene sulfonate, a formalin condensate of an alkylallyl sulfonate, a higher alcohol sulfuric acid ester salt, an alkyl or alkylallyl ether sulfuric acid salt, a sulfuric acid ester salt of a higher fatty acid ester, a sulfuric acid ester salt of a higher fatty acid alkylolamide, a sulfated oil and a phosphoric acid ester salt; cationic surfactants such as an alkylamine salt, a polyamine or amino alcohol fatty acid derivative, an alkyl quaternary ammonium salt (alkyltrimethylammonium salt, dialkyldimethylammonium salt, alkyldimethylbenzylammonium salt, etc.), a cyclic quaternary ammonium salt (alkyl pyridinium salt, alkyl isoquinolinium salt, dialkyl morpholinium salt, etc.), a quaternary ammonium salt having a hydroxyl group, a quaternary ammonium salt having an ether bond and a quaternary ammonium salt having an amide bond; and nonionic surfactants such as an ether type nonionic surfactant, an ether ester type nonionic surfactant, a block polymer type nonionic surfactant and a nitrogen-containing nonionic surfactant. However, the emulsifier shall not be limited to these.

The amount of the above emulsifier is usually 0.1 to 10 parts by weight, preferably 0.1 to 5 parts by weight per 100 parts by weight of the diluent-containing organosilica sol.

The above resin mixture is not specially limited. Examples of the resin mixture are a polyvinyl acetate emulsion, a polyvinyl chloride emulsion, a polyvinyl chloride-vinylidene chloride emulsion, and an acrylic resin emulsion.

When the above resin mixture is used, its amount is usually 1 to 100 parts by weight, preferably 5 to 100 parts by weight per 100 parts by weight of the diluent-containing organosilica sol.

The surface treating agent of this invention is applied to a member such as concrete, mortar, fibers or timber by a brushing, spraying, roller touch, bar coater or immersion method.

The surface treating agent applied to the above member surface by such a method penetrates into the member and imparts the member with waterproofness while maintaining water vapor permeability.

The surface treating agent having such characteristics, provided by this invention, can be suitably used for surface treatment, e.g. of concrete, mortar, fibers and timber, and it can be particularly suitably used for surface treatment of concrete and mortar.

EXAMPLES

This invention will be specifically explained by reference to Examples, which, however, shall not be interpreted to limit this invention.

REFERENTIAL EXAMPLE 1

0.08 Gram of concentrated sulfuric acid was added dropwise to 40 g of a silica colloid solution (a silica concentration 20% by weight), and the mixture was stirred. 240 Grams of isopropanol ("IPA" hereinafter) was added to the mixture while the mixture was stirred, and azeotropic dehydration was then carried out. When an amount of a liquid which was distilled off became 150 g, 150 g of IPA was newly added, and azeotropic dehydration was repeated to give a solution having a water content of 1% by weight. 50 Grams of lauryl alcohol was added to the solution while the mixture was stirred, and the mixture was refluxed for 8 hours to give 300 g of an organosilica sol (A) having a silica concentration of 2.7% by weight, a silica hydrophobic ratio of 15.3%, and an IPA content of 80.7%. Further, the IPA was distilled off from the organosilica sol (A) under atmospheric pressure to give 62 g of an organosilica sol (B) having a silica concentration of 12.9% by weight, a silica hydrophobic ratio of 15.3% and an IPA content of 6% by weight.

EXAMPLE 1

0.3 Gram of an ethanol amine compound, an alkylamine compound, an aromatic-cyclic amine compound, or an inorganic basic compound shown in Table 1 was added to 9.6 g of the organosilica sol (A) having a silica concentration of 2.7% by weight, a silica hydrophobic ratio of 15.3%, and an IPA content of 80.7% by weight, obtained in Referential Example 1 to give organosilica sols whose pH's were increased. All of the organosilica sols had pH of more than 9 as shown in Table 1, and no gelation was observed. These organosilica sols were diluted with IPA to obtain surface treating agents having a silica concentration and an IPA content as shown in Table 1.

TABLE 1

| | Organo-silica sol | | Surface treating agent | |
|---|---|---|---|---|
| Alkali | pH | Property | Silica concentration (wt %) | IPA content (wt %) |
| (1) Ethanolamine compound | | | | |
| N,N-dimethylethanolamine | 9.7 | No gelation | 0.45 | 97 |
| Triethanolamine | 9.4 | No gelation | 0.45 | 97 |
| (2) Alakylamine compound | | | | |
| Triethylamine | 9.9 | No gelation | 0.45 | 97 |
| t-Butylamine | 10.1 | No gelation | 0.45 | 97 |
| 2-Ethylhexylamine | 9.6 | No gelation | 0.45 | 97 |
| Triamylamine | 9.8 | No gelation | 0.45 | 97 |
| (3) Aromatic-cyclic amine compound | | | | |
| Aniline | 9.5 | No gelation | 0.45 | 97 |
| Pyridine | 9.7 | No gelation | 0.45 | 97 |
| Pyrrole | 9.4 | No gelation | 0.45 | 97 |
| (4) Inorganic basic compound | | | | |
| NaOH (0.1 N) | 9.2 | No gelation | 0.45 | 97 |
| Ca(OH)$_2$ (0.1 N) | 9.5 | No gelation | 0.45 | 97 |

EXAMPLE 2

0.3 Gram of an ethanol amine compound, an alkylamine compound, or an aromatic-cyclic amine compound shown in Table 2 was added to a 9.6 g of the organosilica sol (B) having a silica concentration of 12.9% by weight, a silica hydrophobic ratio of 15.3% and an IPA content of 6% by weight, obtained in Referential Example 1 to give organosilica sols whose pH's were increased. All of the organosilica sols had pH of more than 9 as shown in Table 2, and no gelation was observed. These organosilica sols were diluted with IPA to obtain surface treating agents having a silica concentration and an IPA content as shown in Table 2. And, when these surface treating agents were allowed to stand for 24 hours, no precipitation took place.

EXAMPLE 3

2 Grams of toluene was added to 2 g of the organosilica sol (B) having a silica concentration of 12.9% by weight, a silica hydrophobic ratio of 15.3%, and an IPA content of 6% by weight, obtained in Referential Example 1, and the resultant mixture was stirred. Then, 0.3 g of an ethanol amine compound, an alkylamine compound or an aromatic-cyclic compound shown in Table 3 was added thereto to give organosilica sols whose pH's were increased. All of the organosilica sols had pH of more than 9 as shown in Table 3, and no gelation was observed. These organosilica sols were diluted with IPA to obtain surface treating agents having a silica concentration and an IPA content as shown in Table 3.

TABLE 2

| | Organo-silica sol | | Surface treating agent | | |
|---|---|---|---|---|---|
| Alkali | pH | Property | Silica concentration (wt %) | IPA content (wt %) | State after 24 hours (*Note) |
| (1) Ethanolamine compound | | | | | |
| N,N-dimethylethanolamine | 9.8 | No gelation | 0.45 | 97 | NP |
| Triethanolamine | 9.5 | No gelation | 0.45 | | NP |
| (2) Alakylamine compound | | | | | |
| Triethylamine | 9.6 | No gelation | 0.45 | 97 | NP |
| t-Butylamine | 9.9 | No gelation | 0.45 | 97 | NP |
| 2-Ethylhexylamine | 10.1 | No gelation | 0.45 | 97 | NP |
| Triamylamine | 9.7 | No gelation | 0.45 | 97 | NP |
| (3) Aromatic-cyclic amine compound | | | | | |
| Aniline | 9.6 | No gelation | 0.45 | 97 | NP |
| Pyridine | 9.9 | No gelation | 0.45 | 97 | NP |
| Pyrrole | 9.8 | No gelation | 0.45 | 97 | NP |

*Note:
NP stands for "no precipitation".

TABLE 3

| | Organo-silica sol | | Surface treating agent | |
|---|---|---|---|---|
| Alkali | pH | Property | Silica concentration (wt %) | IPA content (wt %) |
| (1) Ethanolamine compound | | | | |
| N,N-dimethylethanolamine | 9.6 | No gelation | 0.45 | 97 |
| Triethanolamine | 9.4 | No gelation | 0.45 | 97 |
| (2) Alakylamine compound | | | | |
| Triethylamine | 9.8 | No gelation | 0.45 | 97 |

TABLE 3-continued

| Alkali | Organo-silica sol pH | Property | Surface treating agent Silica concentration (wt %) | IPA content (wt %) |
|---|---|---|---|---|
| t-Butylamine | 9.6 | No gelation | 0.45 | 97 |
| 2-Ethylhexylamine | 9.3 | No gelation | 0.45 | 97 |
| Triamylamine | 9.8 | No gelation | 0.45 | 97 |
| (3) Aromatic-cyclic amine compound | | | | |
| Aniline | 9.7 | No gelation | 0.45 | 97 |
| Pyridine | 9.9 | No gelation | 0.45 | 97 |
| Pyrrole | 9.7 | No gelation | 0.45 | 97 |

EXAMPLE 4

2 Grams of a toluene mixture solvent containing 20 % by weight of IPA was added, with stirring, to 2 g of the organosilica sol (B) having a silica concentration of 12.9% by weight, a silica hydrophobic ratio of 15.3% and an IPA content of 6% by weight, obtained in Referential Example 1, to give an organosilica sol having an IPA content of 13% by weight. Then, 0.3 g of an ethanolamine compound, an alkylamine compound, an aromatic-cyclic amine organic basic compound or an inorganic basic compound was added to give organosilica sols whose pH's were increased. All of these organosilica sols had pH of more than 9, and no gelation was observed. These organosilica sols were diluted with IPA to give surface treating agents having a silica concentration and an IPA content shown in Table 4.

vapor permeability. Methods for these tests were as follows.

Waterproofing Test

A surface treating agent was applied to a calcium silicate plate (100×100×6 mm), and dried for 24 hours. Then, the plate was measured for a water permeability (24 ml/hr) according to JIS A6910. Smaller values for the water permeability show better waterproofness.

Water Vapor Permeability Test

A surface treating agent was applied to a circular 1-3 mortar plate (80ϕ×20 mm) and dried for 24 hours. Then, the plate was measured for a water vapor permeability (g/m$^2$.24 hr) according to JIS Z208. Larger values for the water vapor permeability show better permeability to water vapor.

TABLE 4

| Alkali | Organo-silica sol pH | Property | Surface treating agent Silica concentration (wt %) | IPA content (wt %) |
|---|---|---|---|---|
| (1) Ethanolamine compound | | | | |
| N,N-dimethylethanolamine | 9.7 | No gelation | 0.45 | 97 |
| Triethanolamine | 9.5 | No gelation | 0.45 | 97 |
| (2) Alakylamine compound | | | | |
| Triethylamine | 9.8 | No gelation | 0.45 | 97 |
| t-Butylamine | 9.9 | No gelation | 0.45 | 97 |
| 2-Ethylhexylamine | 9.6 | No gelation | 0.45 | 97 |
| Triamylamine | 9.5 | No gelation | 0.45 | 97 |
| (3) Aromatic-cyclic amine compound | | | | |
| Aniline | 9.7 | No gelation | 0.45 | 97 |
| Pyridine | 9.9 | No gelation | 0.45 | 97 |
| Pyrrole | 9.4 | No gelation | 0.45 | 97 |
| (4) Inorganic basic compound | | | | |
| NaOH (0.1 N) | 9.6 | No gelation | 0.45 | 97 |
| Ca(OH)$_2$ (0.1 N) | 9.9 | No gelation | 0.45 | 97 |

TEST EXAMPLE 1

The surface treating agents obtained in Examples 1 to 4 were subjected to tests on waterproofness and water Tables 5 to 8 show the results of the above waterproofing test and water vapor permeability test.

TABLE 5

| | Surface treating agents of Example 1 | | |
|---|---|---|---|
| Alkali | Appl'n amount* (g/m$^2$) | Water permeability (ml/24 hr) | Water vapor permeability (g/m$^2$ · 24 hr) |
| (1) Ethanolamine compound | | | |
| N,N-dimethylethanolamine | 6 | 0.25 | 79 |
| | 50 | 0.25 | 70 |
| | 100 | 0.25 | 64 |
| Triethanolamine | 6 | 0.25 | 78 |
| (2) Alakylamine compound | | | |

TABLE 5-continued

Surface treating agents of Example 1

| Alkali | Appl'n amount* (g/m²) | Water permeability (ml/24 hr) | Water vapor permeability (g/m² · 24 hr) |
|---|---|---|---|
| Triethylamine | 6 | 0.25 | 79 |
| t-Butylamine | 6 | 0.25 | 79 |
| 2-Ethylhexylamine | 6 | 0.25 | 78 |
| Triamylamine | 6 | 0.25 | 79 |
| (3) Aromatic-cyclic amine compound | | | |
| Aniline | 6 | 0.25 | 79 |
| Pyridine | 6 | 0.25 | 79 |
| Pyrrole | 6 | 0.25 | 78 |
| (4) Inorganic basic compound | | | |
| NaOH (0.1 N) | 6 | 0.25 | 79 |
| Ca(OH)₂ (0.1 N) | 6 | 0.25 | 78 |

*Amount of surface treating agent in terms of solid content.

TABLE 6

Surface treating agents of Example 2

| Alkali | Appl'n amount* (g/m²) | Water permeability (ml/24 hr) | Water vapor permeability (g/m² · 24 hr) |
|---|---|---|---|
| (1) Ethanolamine compound | | | |
| N,N-dimethylethanolamine | 6 | 0.25 | 79 |
| Triethanolamine | 6 | 0.25 | 78 |
| (2) Alakylamine compound | | | |
| Triethylamine | 6 | 0.25 | 78 |
| t-Butylamine | 6 | 0.25 | 79 |
| 2-Ethylhexylamine | 6 | 0.25 | 78 |
| Triamylamine | 6 | 0.25 | 79 |
| (3) Aromatic-cyclic amine compound | | | |
| Aniline | 6 | 0.25 | 79 |
| Pyridine | 6 | 0.25 | 78 |
| Pyrrole | 6 | 0.25 | 79 |

*Amount of surface treating agent in terms of solid content.

TABLE 7

Surface treating agents of Example 3

| Alkali | Appl'n amount* (g/m²) | Water permeability (ml/24 hr) | Water vapor permeability (g/m² · 24 hr) |
|---|---|---|---|
| (1) Ethanolamine compound | | | |
| N,N-dimethylethanolamine | 6 | 0.25 | 78 |
| Triethanolamine | 6 | 0.25 | 79 |
| (2) Alakylamine compound | | | |
| Triethylamine | 6 | 0.25 | 79 |
| t-Butylamine | 6 | 0.25 | 79 |
| 2-Ethylhexylamine | 6 | 0.25 | 79 |
| Triamylamine | 6 | 0.25 | 78 |
| (3) Aromatic-cyclic amine compound | | | |
| Aniline | 6 | 0.25 | 78 |
| Pyridine | 6 | 0.25 | 78 |
| Pyrrole | 6 | 0.25 | 79 |

*Amount of surface treating agent in terms of solid content.

TABLE 8

Surface treating agents of Example 4

| Alkali | Appl'n amount* (g/m²) | Water permeability (ml/24 hr) | Water vapor permeability (g/m² · 24 hr) |
|---|---|---|---|
| (1) Ethanolamine compound | | | |
| N,N-dimethylethanolamine | 6 | 0.25 | 78 |
| Triethanolamine | 6 | 0.25 | 78 |

TABLE 8-continued

Surface treating agents of Example 4

| Alkali | Appl'n amount* (g/m²) | Water permeability (ml/24 hr) | Water vapor permeability (g/m² · 24 hr) |
|---|---|---|---|
| (2) Alakylamine compound | | | |
| Triethylamine | 6 | 0.25 | 79 |
| t-Butylamine | 6 | 0.25 | 79 |
| 2-Ethylhexylamine | 6 | 0.25 | 78 |
| Triamylamine | 6 | 0.25 | 79 |
| (3) Aromatic-cyclic amine compound | | | |
| Aniline | 6 | 0.25 | 79 |
| Pyridine | 6 | 0.25 | 79 |
| Pyrrole | 6 | 0.25 | 78 |
| (4) Inorganic basic compound | | | |
| NaOH (0.1 N) | 6 | 0.25 | 78 |
| Ca(OH)₂ (0.1 N) | 6 | 0.25 | 78 |

*Amount of surface treating agent in terms of solid content.

COMPARATIVE TEST EXAMPLE

Tests on waterproofness and water vapor permeability were carried out without applying any surface treating agent. The water permeability was 7.50 ml/24 hr, and the water vapor permeability was 81 g/m².24 hr.

TEST EXAMPLE 2

Figure 2:
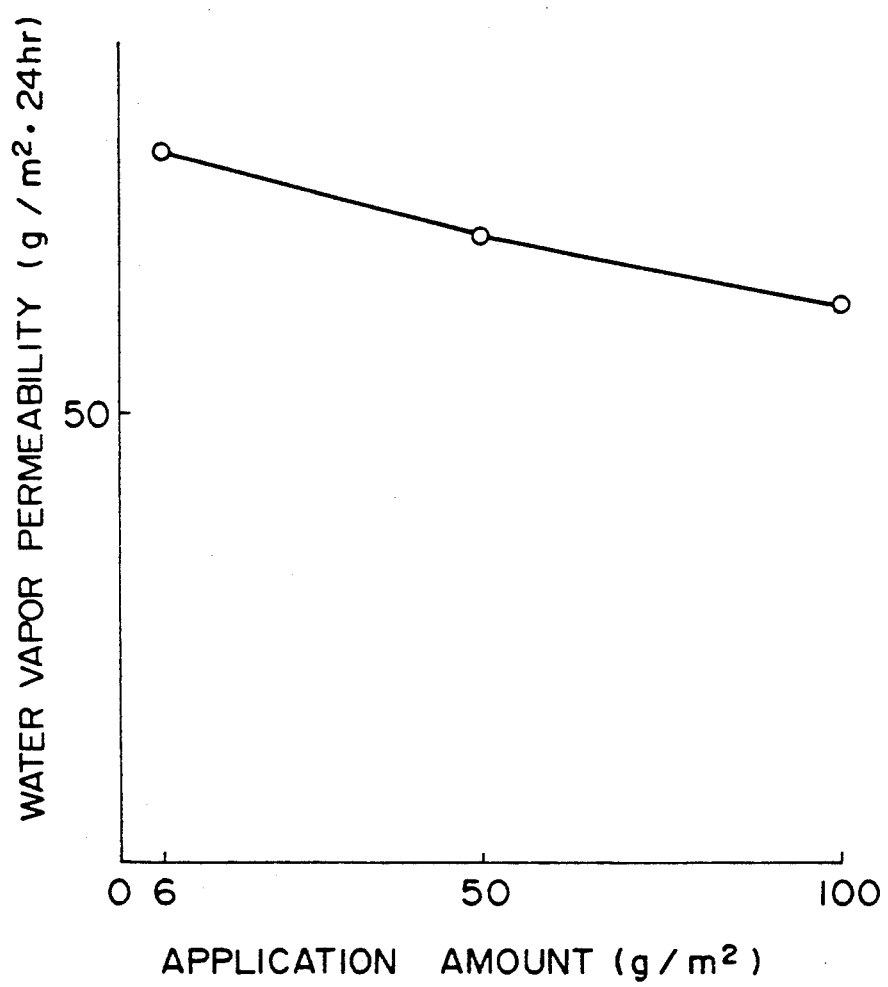
FIG. 2 is a graph for a relationship between an application amount of a surface treating agent of this invention and water vapor permeability.

The surface treating agent prepared in Example 1 using N,N-dimethylethanolamine was applied to circular 1-3 mortar plates (80ϕ×20 mm), and there was obtained a relationship between an application amount and water permeability and a relationship between an application amount and water vapor permeability. FIG. 1 shows the relationship between an application amount and water permeability, and FIG. 2 shows the relationship between an application amount and water vapor permeability In addition, the nontreated substrate mortar had a water permeability of 7.5 ml/24 hr, and a permeability to water vapor of 81 g/m², 24 hr.

The above results show the following: When the surface treating agent of this invention is applied to a calcium slicate plate or mortar plate, the water permeability thereof is remarkably reduced or the waterproofness thereof is improved, and the water vapor permeability thereof is little decreased or the air permeability thereof is sufficiently maintained. Further, as is shown in FIG. 1, even if the application amount is decreased, no change in water permeability is observed. That is, the surface treating agent of this invention can impart waterproofness even when a small amount thereof is used. It is therefore seen that the surface treating agent of this invention can be put to practical use. Moreover, as is shown in FIG. 2, even if the application amount is increased, the water vapor permeability is little decreased. It is therefore seen that even if a large amount of the surface treating agent of this invention is used, the air permeability thereof can be sufficiently maintained. Further, a long time observation on the concrete on which the surface treating agent of this invention was applied revealed that, differing from a surface treating agent containing a conventional highly acidic organosilica sol, the surface treating agent of this invention does not deteriorate concrete and is excellent in concrete durability.

What is claimed is:

1. A process for the production of an organosilica sol, which comprises
   (a) acidifying a silica sol;
   (b) adding an organic solvent to the silica sol from (a) and subjecting the resultant mixture to an azeotropic dehydration;
   (c) adding a higher alcohol to the silica sol to subject the resultant mixture from (b) to an esterification reaction, thereby to obtain an organosilica sol whose pH is in an acidic region and the silica surface of which is imparted with a hydrophobic nature; and
   (d) treating the organosilica sol whose pH is in an acidic region with an alkali to increase the pH.

2. The process according to claim 1, wherein said organosilica sol having a pH in an acidic region has a lower alcohol content of not less than 10% by weight is treated with said alkali directly or after said organosilica sol is diluted with a diluent, thereby to increase the pH to not less than 5.0.

3. The process according to claim 2, wherein the alkali is an inorganic or organic basic compound.

4. The process according to claim 1, wherein said organosilica sol having a pH in an acidic region has a lower alcohol content of not more than 10% by weight; said alkali is an organic basic compound which serves to increase the pH to not less than 5.0, and, optionally wherein the process further comprises diluting said organosilica sol with a diluent.

5. The process according to claim 1, which further comprises adding a solvent containing a lower alcohol to said organosilica sol having a pH in an acidic region and having a lower alcohol content which is not more than 10% by weight, to increase the lower alcohol content to not less than 10% by weight, treating the organosilica sol with said alkali to increase the pH to not less than 5.0, and, optionally, diluting the organosilica sol with a diluent.

6. The process according to claim 5, wherein the alkali is an inorganic or organic basic compound.

7. The process according to claim 1, wherein the silica sol is acidified to a pH of 3 to 4; the organic solvent is selected from the group consisting of methanol, ethanol, n-propanol, n-butanol and amyl alcohol; the higher alcohol is selected from the group consisting of hexanol, heptanol, octanol, nonanol, capryl alcohol, lauryl alcohol, myristyl alcohol, cetyl alcohol and stearyl alcohol; the esterification is carried out less than 0.01% by weight; said hydrophobic nature being such that the organosilica sol has a percentage of organic hydrophobic groups to total OH groups on the silica surface of not less than 1%; in steps (c) and (d) said pH in the acidic region being 3.89 or less; and said alkali being selected from the group consisting of N,N-dimethylethanolamine, methyldiethanolamine, triethanolamine, N,N-diethylethanolamine, N,N-dipropylethanolamine, triethylamine, pyridine, aniline, pyrrole, cyclohexylamine, sodium hydroxide and potassium hydroxide.

8. The process according to claim 7, wherein said organosilica sol has a silica concentration not less than 0.1% by weight and said percentage of organic hydrophobic groups to total OH groups on the silica surface is not less than 3%.

9. The process according to claim 4, wherein the diluent is selected from the group consisting of water, methanol, ethanol, propanol, isopropanol, butanol, pentanol, heptanol, octanol, benzene, toluene, xylene, ethylbenzene, cumene, cyclohexane, ethylcyclohexane, decalin, diethyl ether, ethyl vinyl ether, butyl vinyl ether, anisole, dioxane, glycol methyl ether, glycol ethyl ether, glycol butyl ether, methyl ethyl ketone, 2-pentanone, 3-pentanone, methyl isobutyl ketone, 2-heptanone, 4-heptanone, diisobutyl ketone, acetonyl acetone, mesithyl oxide, mineral spirit and kerosene.

* * * * *

UNITED STATES PATENT AND TRADEMARK OFFICE
CERTIFICATE OF CORRECTION

PATENT NO. : 5,185,037
DATED : February 9, 1993
INVENTOR(S) : Akira KAIJOU

It is certified that error appears in the above-identified patent and that said Letters Patent is hereby corrected as shown below:

Column 14, line 53 (claim 5), before "having" delete "and".

Signed and Sealed this

Thirtieth Day of August, 1994

Attest:

BRUCE LEHMAN

Attesting Officer

Commissioner of Patents and Trademarks